United States Patent [19]

Koster

[11] Patent Number: 5,058,843
[45] Date of Patent: Oct. 22, 1991

[54] ADJUSTABLE TRIM STRIP MOUNTING ASSEMBLY

[75] Inventor: Brian L. Koster, Mendota Heights, Minn.

[73] Assignee: Minnesota Mining and Manufacturing Company, St. Paul, Minn.

[21] Appl. No.: 406,956

[22] Filed: Sep. 11, 1989

[51] Int. Cl.[5] ............................................. F16M 13/00
[52] U.S. Cl. .................. 248/221.4; 52/718.1; 248/345.1; 248/915; 403/11
[58] Field of Search .................. 248/558, 224.2, 221.4, 248/915, 345.1, 670; 52/718.1; 403/11, 381, 331

[56] References Cited

U.S. PATENT DOCUMENTS

| | | | |
|---|---|---|---|
| 2,625,722 | 1/1953 | West | 52/718.1 X |
| 2,911,700 | 11/1959 | Wieland | 248/670 |
| 3,284,940 | 11/1966 | Putman | 248/221.4 X |
| 3,606,433 | 9/1971 | Kunevicius | 52/718.1 X |
| 3,856,194 | 12/1974 | Helm | 52/718.1 X |
| 3,916,055 | 10/1975 | Wagner | 428/161 |
| 4,564,732 | 1/1986 | Lancaster et al. | 403/381 X |
| 4,709,525 | 12/1987 | Adell | 52/718 |

FOREIGN PATENT DOCUMENTS 2012860 8/1979 United Kingdom .

*Primary Examiner*—David L. Talbott
*Attorney, Agent, or Firm*—Gary L. Griswold; Walter N. Kirn; William L. Huebsch

[57] ABSTRACT

A mounting assembly adaptable for attaching elongate trim strips of different widths to a surface of a panel. The mounting assembly comprises first and second parts each having an anchor surface for attachment to the panel, and an elongate ridge adapted to be received in a recess opening through the back of the trim strip along a different one of the edges of wall portions defining the recess. The ridge has a holding surface disposed at an obtuse angle with respect to the anchor surface. Means are provided for releasably attaching the parts together with the anchor surfaces generally aligned and with the ridges projecting in opposite directions spaced by one of several predetermined distances to afford engagement of edges of parallel converging wall portions on trim strips of one of several predetermined widths with the holding surfaces of the ridges.

6 Claims, 2 Drawing Sheets

5,058,843

ADJUSTABLE TRIM STRIP MOUNTING ASSEMBLY

TECHNICAL FIELD

The present invention relates to mounting assemblies for attaching elongate trim strips to generally planar surfaces of panels.

BACKGROUND ART

Mounting assemblies are known for attaching to generally planar surfaces of panels (e.g., the side of a vehicle) elongate trim strips of the type having a stiff resiliently flexible wall defining an elongate recess opening along a back side of the trim strip with the recess having an inlet opening with opposite sides defined by distal edges of parallel converging portions of the wall spaced by predetermined distances at the inlet opening. The mounting assembly for this purpose described in British Patent Application GB 2,012,860 A includes a part having an anchor surface adapted to be positioned adjacent the planar surface on the panel, and means in the form of a strip coated with pressure sensitive adhesive on both sides for attaching the anchor surface of the part to the panel. The part has elongate ridges flanking the anchor surface along opposite sides each adapted to be received in the recess of the trim strip along a different one of its wall portions. Each ridge has a holding surface disposed at an obtuse angle with respect to the anchor surface, and a cam surface on the side of the holding surface opposite the cam surface disposed at an acute angle with respect to the anchor surface. The ridges are spaced by a predetermined distance to afford engagement of the distal edges of the parallel converging wall portions of a trim strip of a predetermined width with the holding surface of the ridges. The part has slots opening through its side adjacent its anchor surface and extending longitudinally along said part so that both of its ridges are connected to a major portion of the part only by resiliently flexible connecting portions of the part affording movement of its ridges toward its major portion. The cam surfaces along the ridges are disposed so that either cam surface can be engaged by one of the distal edges on the strip when the other distal edge on the strip is positioned against the holding surface on the other side of the part and, when the trim strip is then pressed toward the panel, to be cammed by that one edge portion to produce resilient bending of the adjacent connecting portion and movement of the ridge toward the major portion of the part and thereby afford movement of that one edge portion to a position along the adjacent holding surface. The connecting portions thereafter bias both of the holding surfaces against the distal edges of the wall and thereby hold the trim strip on the panel. The trim strip can subsequently be removed from the panel by pressing sideways on the trim strip to bend one of the ridges toward the major portion of the strip so that the distal edge of the trim strip opposite the bent ridge can be lifted away from the panel around the opposite ridge.

The mounting assembly described in British Patent Application GB 2,012,860 A, however, can only be used to mount trim strips of one width, so that if trim strips of different widths are to be mounted, mounting assemblies of different widths must be stocked.

DISCLOSURE OF INVENTION

The present invention provides a mounting assembly generally of the type described above that is adjustable so that it can be adapted to accept and mount trim strips of different widths to a panel.

According to the present invention there is provided a mounting assembly adaptable for attaching elongate trim strips of different widths to a generally planar surface of a panel, which trim strips are of the type having a wall defining an elongate recess opening along a back side of the trim strip with the recess having an inlet opening with opposite sides defined by distal edges of parallel converging portions of the wall spaced by predetermined distances at the inlet opening. The mounting assembly comprises first and second parts, which parts each have an anchor surface adapted to be positioned adjacent and to be attached to the planar surface on a panel, and an elongate ridge flanking the anchor surface and adapted to be received in the recess of the trim strip along a different one of the wall portions. The ridge has a holding surface disposed at an obtuse angle with respect to the anchor surface. Means are provided for releasably attaching the parts together with the anchor surfaces generally aligned and with the ridges projecting in opposite directions spaced by one of several predetermined distances to afford engagement of the distal edges of the parallel converging wall portions of trim strips of one of several predetermined widths with the holding surfaces of the ridges.

In a preferred embodiment the parts each include a planar surface generally parallel to the anchor surface, a row of equally spaced dovetail ribs parallel to the ridges projecting from the planar surface, the planar surface on one of the parts being on the side of the part adjacent the anchor surface and the planar surface on the other of the parts being on the side of the part opposite its anchor surface, and the dovetail ribs of each of the parts is positioned and shaped for engagement between the dovetail ribs of the other of the parts to provide said means for releasably attaching said parts together by engaging the ribs to space the ribs at different distances.

Alternatively, the means for releasably attaching the parts together can be provided by a plate having spaced ribs adapted to engage different ones of several grooves on the parts; or by the parts each having a groove generally parallel to its ridge and opening through the side of the part opposite said ridge, and the assembly further including a spacer plate having opposite parallel edge portions adapted to be positioned in the grooves, which spacer plate can be selected from plates of different widths.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
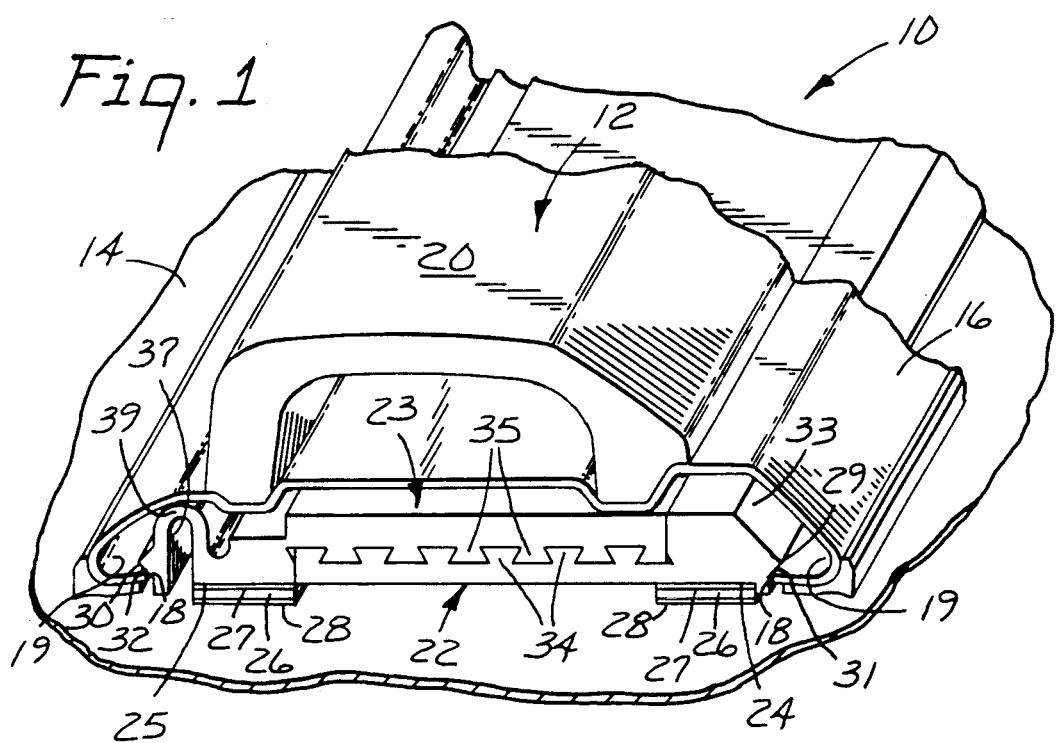
FIG. 1 is a fragmentary perspective view of a first embodiment of a mounting assembly according to the present invention having a trim strip attached thereto and being attached to a surface on a panel.

Referring now to FIG. 1 of the drawing, a first embodiment of a mounting assembly 10 according to the present invention is illustrated attaching a trim strip 12 to a generally planar surface 14 on a panel. The trim strip 12 attached by the mounting assembly 10 is of a conventional type having a stiff metal wall 16 which defines an elongate recess opening along a back side of the trim strip 12 with the recess having an inlet opening with opposite sides defined by parallel distal edges 18 of converging portions 19 of the wall 16 spaced by predetermined distances at the inlet opening, and having an elongate bumper strip 20 of polymeric material which has a generally C-shaped cross section and ends attached as by a suitable adhesive along recesses in the outer surface of the wall 16.

Figure 2:
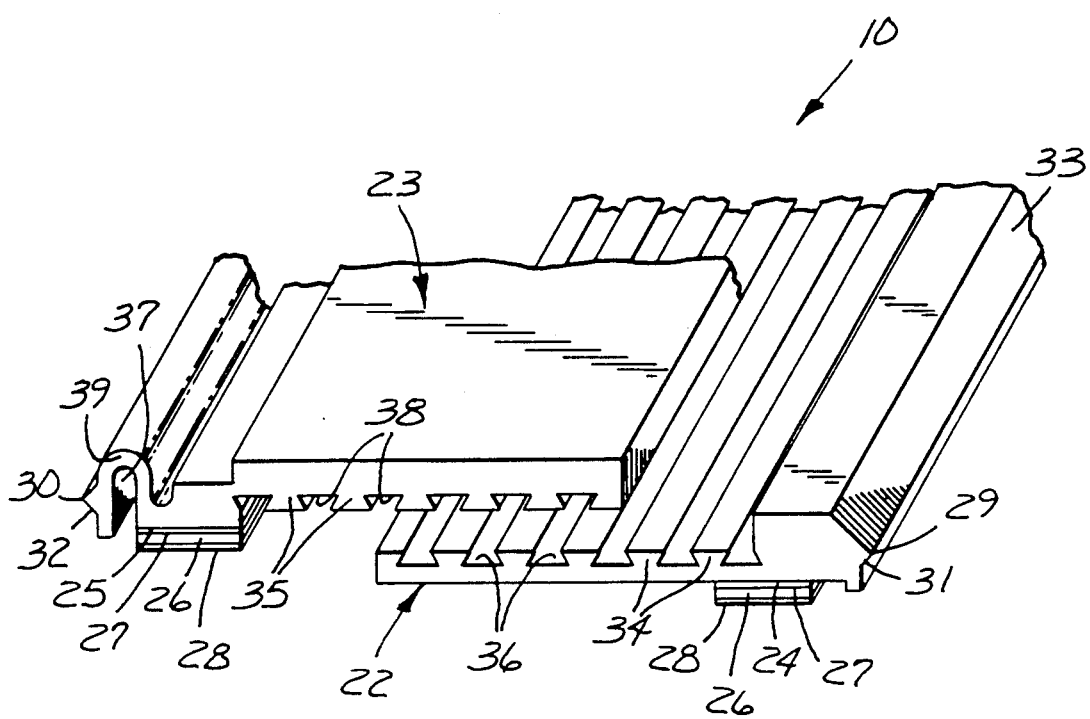
FIG. 2 is a fragmentary perspective view of the mounting assembly of FIG. 1 with parts thereof separated.

Generally the mounting assembly 10, illustrated in both FIGS. 1 and 2, comprises first and second parts 22 and 23. The parts 22 and 23 each have a generally planar anchor surface 24 and 25 respectively adapted to be positioned adjacent the generally planar surface 14 on the panel and to be attached thereto by means in the form of layers 26 of polymeric foam having first major surfaces attached by layers 27 of adhesive to the anchor surfaces 24 and 25 on the parts 22 and 23, and having layers 28 of pressure sensitive adhesive on second major surfaces of the layers 26 of foam provided for attaching the anchor surfaces 24 and 25 of the parts 22 and 23 to the planar surface 14 on the panel. The parts 22 and 23 each also include an elongate ridge 29 and 30 respectively flanking its anchor surface 24 or 25 and adapted to be received in the recess of the trim strip 12 along a different one of the wall portions 19. The ridges 29 and 30 on the parts 22 and 23 each have a holding surface 31 and 32 respectively disposed at an obtuse angle with respect to the anchor surface 24 or 25, which holding surfaces 31 and 32 are adapted to engage the distal edges 18 of the trim strip 12 with the trim strip 12 around the mounting assembly 10 to attach the trim strip 12 to the surface 14 to which the mounting assembly 10 is attached. Also, the ridge 29 has a cam surface 33 on the side of the holding surface 31 opposite the anchor surface 24 disposed at an acute angle with respect to the anchor surface 24. Means including rows of equally spaced dovetail ribs 34 and 35 on the parts 22 and 23 respectively are provided for releasably attaching the parts 22 and 23 together with their anchor surfaces 24 and 25 generally aligned, and the ridges 29 and 30 projecting in opposite directions and spaced by one of several predetermined distances to afford engagement of the distal edges 18 of the parallel converging wall portions 19 of trim strips 12 of several predetermined widths with the holding surfaces 31 and 32 of the ridges 29 and 30.

The row of equally spaced dovetail ribs 34 or 35 on each part 22 or 23 is parallel to its ridge 29 or 30 and projects respectively from a planar surface 36 or 38 on that part 22 or 23 that is generally parallel to its anchor surface 24 or 25. The planar surface 36 on the part 22 is on its side opposite its anchor surface 24; and the planar surface 38 on the part 23 is on its side adjacent its anchor surface 25. The dovetail ribs 34 or 35 of one of the parts 22 or 23 are positioned and shaped for engagement between different ones of the dovetail ribs 34 or 35 of the other of the parts 22 or 23 to provide the means for releasably attaching the parts 22 or 23 together, and to provide means for spacing the ridges 29 and 30 on the parts 22 and 23 at different predetermined distances so that the holding surfaces 31 and 32 thereon can be engaged by the distal edges 18 on trim strips 12 of different widths. A minimum width for the mounting assembly 10 is achieved when all of the ribs 34 or 35 on one of the parts 22 or 23 engage a space on the other as is illustrated in FIG. 1, whereas a maximum width will be obtained when only one rib 34 or 35 on each part 22 or 23 engages a space on the other.

The part 23 has a slot 37 opening through its side adjacent its anchor surface 25 and extending longitudinally along the part 23 so that the ridge 30 is connected to a major portion of the part 23 only by a resiliently flexible connecting portion 39 of the part 23 that, by flexing, affords movement of the ridge 30 relative to its major portion. To afford attaching the trim strip 12 to the mounting assembly 10, the cam surface 33 is disposed to be engaged by one of the distal edges 18 of the wall 16 when the other of its distal edges 18 is positioned against the holding surface 32 on the other side of the mounting assembly 10 and to be cammed by that one distal edge 18 when the trim strip 12 is pressed toward the surface 14 to produce resilient bending of the connecting portion 39 so that the ridge 30 of the part 23 moves toward its major portion and thereby affords movement of the edge 18 initially on the cam surface 33 to a position along the holding surface 31. Thereafter the connecting portion 39 biases both of the holding surfaces 31 and 32 against the distal edges 18 of the trim strip 12, and thereby the trim strip 12 toward the surface 14 of the panel to hold the trim strip 12 on the panel. The trim strip 12 can thereafter be removed from the mounting assembly 10 by manually applying sideways pressure to it parallel to the surface 14 to cause bending of the connecting portion 39, movement of the ridge 30 toward the major portion of the part 23, and separation between the holding surface 31 and the adjacent edge 18 while that adjacent edge 18 is manually lifted away from the surface 14 and around the ridge 29. Typically the surface 14 is a vertical surface on a vehicle, the trim strip 12 extends horizontally, and the mounting assembly is mounted on the surface with the ridge 30 uppermost, so that such sideways pressure to remove the trim strip 12 is applied downwardly along the surface 14.

Preferably as illustrated, with the edges 18 of the trim strip 12 both along the holding surfaces 31 and 32, the inner surface of the wall 16 of the trim strip 12 will be in light frictional contact with the surface of the mounting assembly 10 at locations generally opposite the anchor surfaces 24 and 25 to both provide means for locating one mounting assembly 10 or more at a predetermined location along the cavity in the trim strip 12 before the mounting assembly 10 is attached to the surface 14, and means for then supporting the layers 28 of adhesive on the mounting assembly 10 in positions where they can be pressed against the surface 14 by manipulation of the trim strip 12 after the mounting assembly 10 is pre positioned in the cavity in the trim strip 12. Such application of the mounting assembly 10 pre positioned in the trim strip 12 to the surface 14 can provide a desirable alternative to first adhering the mounting assembly 10 to the surface 14 and then attaching the trim strip 12 to the mounting assembly 10 as was described above.

Figure 3:
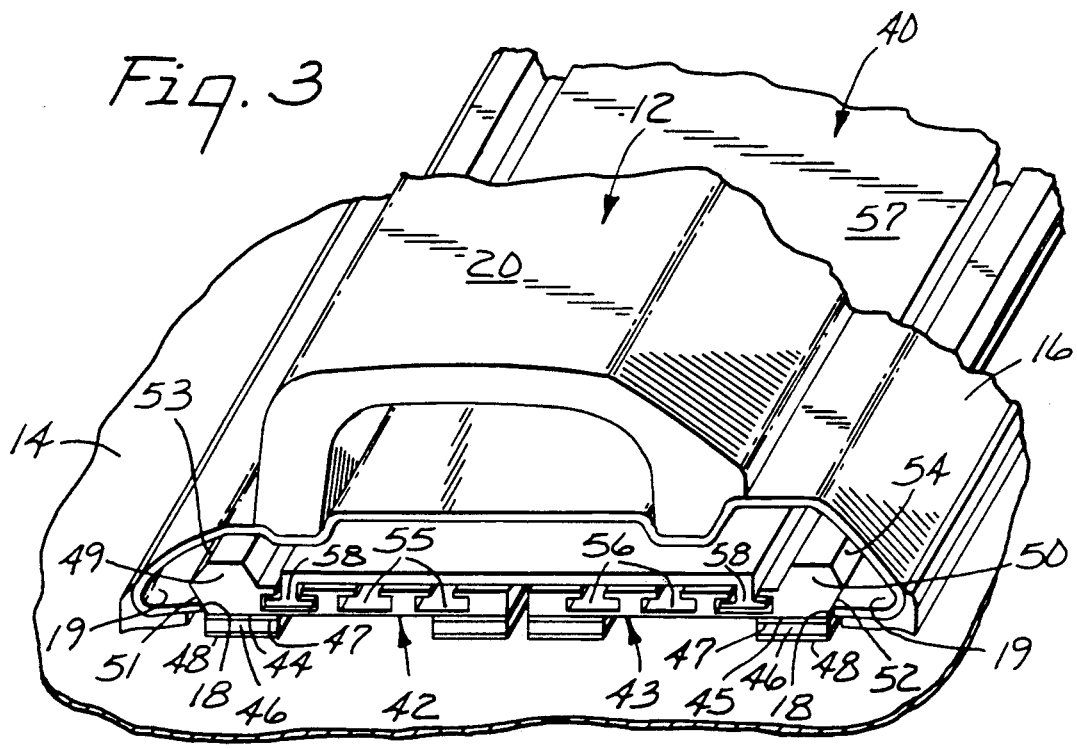
FIG. 3 is a fragmentary perspective view of a second embodiment of a mounting assembly according to the present invention having a trim strip attached thereto and being attached to a surface on a panel.

Referring now to FIG. 3 of the drawing, a second embodiment of a mounting assembly 40 according to the present invention is illustrated attaching the trim strip 12 to the generally planar surface 14 on the panel.

Generally the mounting assembly 40 comprises first and second parts 42 and 43, which parts 42 and 43 each have a generally planar anchor surface 44 and 45 respectively adapted to be positioned adjacent the generally planar surface 14 on the panel and to be attached thereto by means in the form of layers 46 of polymeric foam having first major surfaces attached by layers 47 of adhesive to the anchor surfaces 44 and 45 on the parts 42 and 43 and second major surfaces adapted to be attached by layers 48 of adhesive to the planar surface 14 on the panel. The parts 42 and 43 also each include an elongate ridge 49 and 50 respectively flanking their anchor surface 44 or 45 and adapted to be received in the recess of the trim strip 12 along a different one of the wall portions 19. The ridges 49 and 50 have holding surfaces 51 and 52 respectively disposed at an obtuse angle with respect to their respective anchor surfaces 44 and 45 that are adapted to engage the distal edges 18 of the trim strip to attach the trim strip 12 to the surface 14 to which the mounting assembly 40 is attached; and also have cam surfaces 53 and 54 respectively on the side of the holding surfaces 51 and 52 opposite the anchor surfaces 44 and 45 disposed at an acute angle with respect to the anchor surface 44 and 45.

Means including rows of ribs on each part 42 and 43 define rows of T-shaped slots 55 and 56 respectively opening through planar surfaces on the parts that are generally parallel to and on the sides of the parts 42 and 43 opposite their anchor surfaces 44 and 45 and an attachment plate 57 having two spaced parallel T-shaped ribs 58 projecting from one side (one of which ribs 58 is adapted to be positioned in one of the slots 55 or 56 in each of the parts 42 or 43) are provided for releasably attaching the parts 42 and 43 together with their anchor surfaces 44 and 45 generally aligned, and the ridges 49 and 50 projecting in opposite directions and spaced by one of several predetermined distances to afford engagement of the distal edges 18 of the parallel converging wall portions 19 of trim strips 12 of several predetermined widths with the holding surfaces 51 and 52 of the ridges 49 and 50. One of the T-shaped ribs 58 can be positioned in any one of the T-shaped slots 55 in the part 42, and the other T-shaped rib 58 can be positioned in any one of the T-shaped slots 56 in the other part 43. A minimum width for the mounting assembly 40 is achieved when the T-shaped ribs 58 are engaged in the T-shaped slots 55 and 56 closest the ridges 49 and 50 respectively as is illustrated in FIG. 3, whereas a maximum width will be obtained when the T-shaped ribs 58 are engaged in the T-shaped slots 55 and 56 farthest from the ridges 49 and 50.

The mounting assembly 40 is adapted to be pre positioned in the trim strip 12 and to then be adhered by the layers 48 of adhesive to the surface 14 by manual manipulation of the trim strip 12. To facilitate this, the mounting assembly 40 has a thickness such that with the edges 18 of the trim strip 12 both along the holding surfaces 51 and 52 of the mounting assembly 40, the surface of the mounting assembly opposite the anchor surfaces 44 and 45 will be in light frictional engagement with the inner surface of the wall 16 of the trim strip 12 to both provide means for locating one mounting assembly 40 or more at a predetermined location along the cavity in the trim strip 12 before the mounting assembly 40 is attached to the surface 14, and to provide means for then supporting the layers 48 of adhesive on the mounting assembly 40 in positions where they can be pressed against the surface 14 by manipulation of the trim strip 12 after the mounting assembly 40 is pre positioned in the cavity in the trim strip 12.

Alternatively, (though not illustrated) the mounting assembly 40 could be formed with one or more slots positioned like the slot 37 in the mounting assembly 10 so that the mounting assembly 40 could be attached to the surface 14 and then have the trim strip 12 attached to the mounting assembly 40 in the manner described above for the mounting assembly 10; or the mounting assembly 40 could be attached to the surface 14 and the trim strip 12 could then be attached to the mounting assembly 40 by positioning one of its distal edges 18 on one of the cam surfaces 53 or 54 and positioning the other of its distal edges 18 against the holding surface 51 or 52 on the other side of the trim strip 12, and then pressing the trim strip toward the mounting assembly 40 to cam the distal edge 18 along the cam surface 53 or 54 on which it originally rested and around the ridge 49 or 50 which would require resilient bending of the wall 16 of the trim strip to spread the distal edges 18 and may not be possible with all trim strips.

Figure 4:
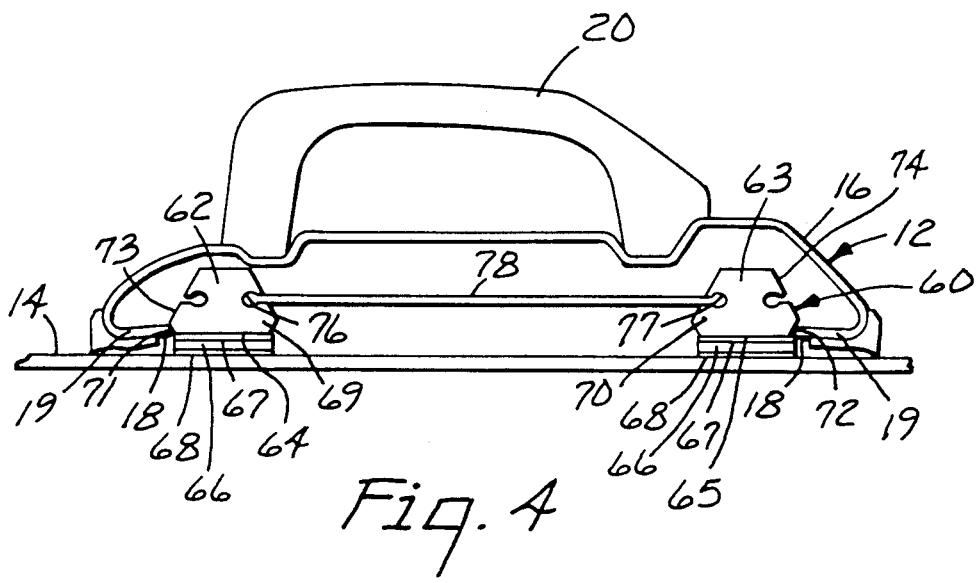
FIG. 4 is an end view of a third embodiment of a mounting assembly according to the present invention having a trim strip attached thereto.

Referring now to FIG. 4 of the drawing, a third embodiment of a mounting assembly 60 according to the present invention is illustrated attaching the trim strip 12 to the generally planar surface 14 on the panel.

Generally the mounting assembly 60 comprises first and second parts 62 and 63, which parts 62 and 63 each have a generally planar anchor surface 64 and 65 respectively adapted to be positioned adjacent the generally planar surface 14 on the panel and to be attached thereto by means in the form of layers 66 of polymeric foam having first major surfaces attached by layers 67 of adhesive to the anchor surfaces 64 and 65 on the parts 62 and 63 and second major surfaces adapted to be attached by layers 68 of adhesive to the planar surface 14 on the panel. The parts 62 and 63 also each include an elongate ridge 69 and 70 respectively flanking their anchor surface 64 or 65 and adapted to be received in the recess of the trim strip 12 along a different one of the wall portions 19. The ridges 69 and 70 have holding surfaces 71 and 72 respectively disposed at an obtuse angle with respect to their respective anchor surfaces 64 and 65 that are adapted to engage the distal edges 18 of the trim strip to attach the trim strip 12 to the surface 14 to which the mounting assembly 60 is attached; and also have cam surfaces 73 and 74 respectively on the side of the holding surfaces 71 and 72 opposite the anchor surfaces 64 and 65 disposed at an acute angle with respect to the anchor surface 64 and 65.

Means including the parts 62 and 63 each having a groove 76 or 77 respectively generally parallel to its ridge 69 or 70 with the groove 76 or 77 having an enlarged inner portion and opening through the side of the part 62 or 63 opposite its ridge 69 or 70 and a separating plate 78 having opposite edge portions adapted to be positioned in the grooves 76 or 77 are provided for releasably attaching the parts 62 and 63 together with their anchor surfaces 64 and 65 generally aligned, and the ridges 69 and 70 on the parts 62 and 63 projecting in opposite directions and spaced by one of several predetermined distances determined by the width of the separating plate 78 to afford engagement of the distal edges 18 of the parallel converging wall portions 19 of trim strips 12 of one of several predetermined widths with the holding surfaces 71 and 72 of the parts 62 and 63 to hold the trim strip 12 against the surface 14. Different width separating plates 78 are used to provide different desired widths for the mounting assembly 60. As illustrated, the parts 62 and 63 are identical and have grooves on both sides so, if desired to attach a particularly wide trim strip 12, a third part (not shown) identical to the parts 62 and 63 and a second separating plate (not shown) identical to the separating plate 78 could be added to the mounting assembly 60 with the third part between the parts 62 and 63, and the two separating plates extending respectively between the part 62 and the third part, and between the third part and the part 63.

The mounting assembly 60 is adapted to be pre positioned in the trim strip 12 and to then be adhered by the layers 68 of adhesive to the surface 14 by manual manipulation of the trim strip 12. To facilitate this, the mounting assembly 60 has a thickness such that with the edges 18 of the trim strip 12 both along the holding surfaces 71 and 72 of the mounting assembly 60, the surface of the mounting assembly 60 opposite the anchor surfaces 64 and 65 will be in light frictional engagement with the inner surface of the wall 16 of the trim strip 12 to both provide means for locating one mounting assembly 60 or more at a predetermined location along the cavity in the trim strip 12 before the mounting assembly 60 is attached to the surface 14, and to provide means for then supporting the layers 68 of adhesive on the mounting assembly 60 in positions where they can be pressed against the surface 14 by manipulation of the trim strip 12 after the mounting assembly 60 is pre positioned in the cavity in the trim strip 12. Alternatively, (though not illustrated) the mounting assembly 60 could be formed with one or more slots positioned like the slot 37 in the mounting assembly 10 described above so that the mounting assembly 60 could be attached to the surface 14 and then have the trim strip 12 attached to the mounting assembly 60 in the manner described above for the mounting assembly 10; or the mounting assembly 60 could be attached to the surface 14 and the trim strip 12 could then be attached to the mounting assembly 60 by positioning one of its distal edges 18 on one of the cam surfaces 73 or 74 and positioning the other of its distal edges 18 against the holding surface 71 or 72 on the other side of the trim strip 12, and then pressing the trim strip 12 toward the mounting assembly 60 to cam the distal edge 18 along the cam surface 73 or 74 on which it originally rested and around the ridge 69 or 70 which would require resilient bending of the wall 16 of the trim strip to spread the distal edges 18 and might not be possible with all trim strips.

The present invention has now been described with reference to three embodiments thereof. It will be apparent to those skilled in the art that many changes can be made in the embodiments described without departing from the scope of the present invention. Thus the scope of the present invention should not be limited to the structures described in this application, but only by structures described by the language of the claims and the equivalents of those structures.

I claim:

1. A mounting assembly adaptable for attaching elongate trim strips of different widths to a generally planar surface of a panel, said trim strips each having a wall defining an elongate recess opening along a back side of the trim strip with the recess having an inlet opening with opposite sides defined by distal edges of parallel converging portions of said wall spaced by predetermined distances at said inlet opening, said mounting assembly including first and second parts, said parts each comprising an anchor surface adapted to be positioned adjacent the planar surface on a said panel, an elongate ridge flanking said anchor surface and adapted to be received in the recess of a said trim strip along a different one of said wall portions, said ridge having a holding surface disposed at an obtuse angle with respect to said anchor surface;

means for releasably attaching said parts together with said anchor surfaces generally aligned and said ridges projecting in opposite directions and with said ridges spaced by one of several predetermined distances to afford engagement of the distal edges of the parallel converging wall portions of trim strips of one of several predetermined widths with the holding surfaces of said ridges; and means for attaching the anchor surfaces of the parts to the planar surface on a said panel.

2. A mounting assembly according to claim 1 wherein said parts each include a planar surface generally parallel to said anchor surface, a row of equally spaced dovetail ribs parallel to said ridges projecting from said planar surface, the planar surface on one of said parts being on the side of the part adjacent said anchor surface and the planar surface on the other of said parts being on the side of the part opposite said anchor surface and said dovetail ribs of one of said parts being positioned and shaped for engagement between the dovetail ribs of the other of said parts to provide said means for releasably attaching said parts together.

3. A mounting assembly according to claim 1 wherein said means for releasably attaching said parts together are provided by said parts each including a planar surface generally parallel to said anchor surface on the side of the part opposite said anchor surface, a row of spaced grooves parallel to said ridges and opening through said planar surface, said grooves having inner portions of greater width than their portions adjacent said planar surface, and an attachment plate having spaced parallel projecting ribs adapted to enter said grooves.

4. A mounting assembly according to claim 1 wherein said means for releasably attaching said parts together are provided by said parts each having a groove generally parallel to said ridge and opening through the side of the part opposite said ridge, and said assembly including a spacer plate having opposite parallel edge portions adapted to be positioned in said grooves.

5. A mounting assembly according to claim 1 wherein said means for attaching the anchor surfaces of the parts to the planar surface on a said panel comprises layers of polymeric foam having first major surface attached to said anchor surfaces, opposite second major surfaces, and layers of pressure sensitive adhesive on said second major surfaces.

6. A mounting assembly according to claim 1 wherein one of said parts has a cam surface on the side of said holding surface opposite said anchor surface disposed at an acute angle with respect to said anchor surface and one of said parts has a slot opening through the side of said part adjacent said anchor surface and extending longitudinally along said part so that said ridge on said one part is connected to a major portion of said one part only by a resiliently flexible connecting portion of said one part affording movement of said ridge toward said major portion, said cam surface is disposed to be engaged by one of said distal edges of said wall when the other of said distal edges is positioned against the holding surface on the other side of the trim strip and to be cammed by said one edge portion when said trim strip is pressed toward said surface to produce resilient bending of said connecting portion and movement of said ridge of said one part toward said major portion and thereby afford movement of said one edge portion to a position along said holding surface, said connecting portion thereafter biasing both of said holding surfaces against said distal edges and thereby the trim strip toward the panel, but being bendable by pressing sideways on the trim strip to affording movement of the ridge of said one part toward that major portion and removal of the trim strip from the mounting assembly by pulling the distal edge of the trim strip opposite the connecting portion away from the surface.

* * * * *